June 28, 1966  M. H. BLIZZARD  3,258,586
BOUNCE LIGHT BEAM DEFLECTOR
Filed April 30, 1964

United States Patent Office 3,258,586
Patented June 28, 1966

3,258,586
BOUNCE LIGHT BEAM DEFLECTOR
Mike H. Blizzard, 407 Edgewood Ave., Linwood, N.J.
Filed Apr. 30, 1964, Ser. No. 363,947
1 Claim. (Cl. 240—1.3)

This invention relates to light deflecting devices, and more particularly to a bounce light beam deflector for flash and strobe lights.

It is an object of the present invention to provide a bounce light beam deflector which will bounce light from a ceiling, wall or corner according to the direction the deflector plate is aimed and it will simultaneously beam a small portion of the regular flash straight forward to fill out any harsh shadows caused by the soft, natural light rays beamed by the deflector plate to the ceiling, wall or corner and reflected back onto the subject being photographed.

Another object of the present invention is to provide a bounce light beam deflector which will be used outdoors to beam light from a light colored wall or under an open sky; or elsewhere the unit can be used as a fill light for the sunshine, by using the amount of direct light beamed straight ahead by the flat section cutoff on the bottom of the deflector plate. The amount of light is adjustable by the camera user by loosening a thumb screw and raising or lowering the deflector plate.

Professional photographers realize that the best photographs are made by bounce light because it approximates a more natural light but it produces deep shadows under the eyes of the subject and other areas. This invention serves to bounce the light, reducing the shadow ratio, and may be used outdoors as a fill light. When the subject is outdoors and in the shade under the open sky and a light colored wall is located adjacent to the subject, the reflector may be aimed towards the wall and the light rays will be bounced to the wall and back to the subject.

A further object of the present invention is to provide a bounce light beam deflector which, by turning the deflector plate upside down so that the flat slot seats down on the thumb screw, the deflector stores itself right on the flashgun and protects the lenses of an electronic flashgun or the flash reflector of a flash bulb unit. For regular use of the flash, the plate may be swung sideways and downward, out of the way, or may be completely removed from the flash gun.

A still further object of the present invention is to provide a bounce light beam deflector which will utilize the principle of bounce light photography without removing the flash or strobe light from its position on the camera or the flash bracket.

Other objects of the invention are to provide a bounce light beam deflector bearing the above objects in mind which is of simple construction, has a minimum number of parts, is inexpensive to manufacture and efficient in operation and in use.

For other objects and for a better understanding of the invention, reference may be had to the following detailed description taken in conjunction with the accompanying drawing, in which.

Figure 1:
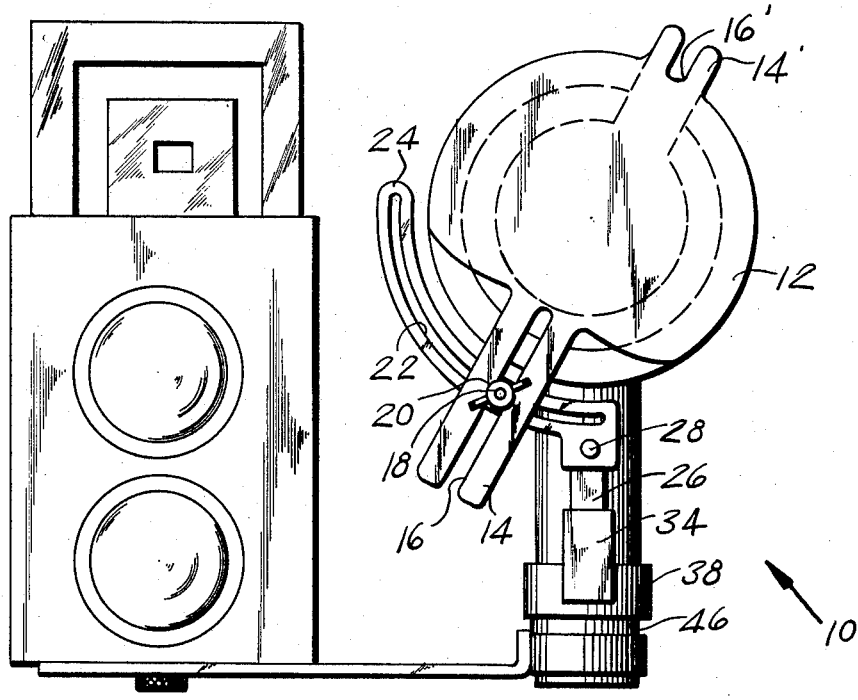
FIGURE 1 is a front view of the present invention shown in operative use.
Figure 2:
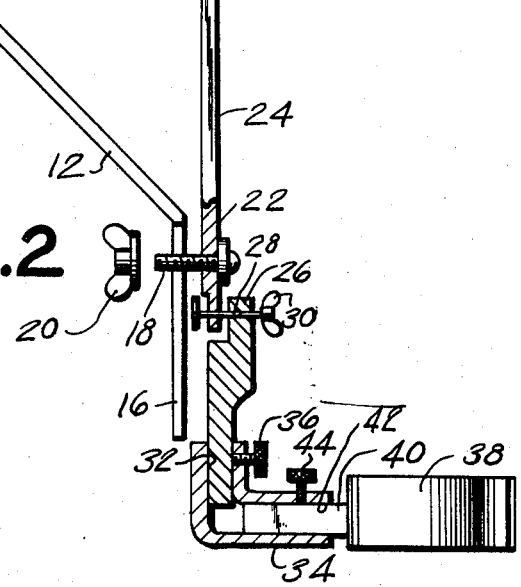
FIGURE 2 is a side elevational view of the invention shown removed from FIGURE 1.

Referring now more in detail to the drawing, a bounce light beam deflector 10 made in accordance with the present invention is shown to include a reflector plate 12 having an elongated tongue 14. Tongue 14 is oppositely opposed to a tongue 14' on the other side of reflector plate 12, and a slotted opening is provided in tongue 14. Opening 16 through tongue 14 and opening 16' through tongue 14 are provided for a purpose which will hereinafter be described. A threaded bolt 18 receives a wing nut 20 which provides a means for securing reflector plate 12. Bolt 18 is received within an arcuate slot 22 of an arcuate bracket member 24, and openings 22 of bracket member 24 in combination with openings 16 and 16' of tongues 14 and 14' respectively provide a combination means for adjusting the position of the reflector plate 12. Arcuately configurated bracket member 24 receives and is secured to a post 26 and a threaded bolt 28 receives one end of bracket member 24 and is secured by wing nut means 30 to the upper extremity of post 26. The lower extremity of post 26 is slidably received within an opening 32 of an L-shaped hollow sleeve 34. Post 26 is secured within opening 32 by means of a knurled set screw 36 threadingly received within the upper extremity of sleeve 34 and thus screw 36 provides height adjustment means for post 26. A spring clamp 38 is provided with a radially extending bar 40 which is slidably received within opening 42 of sleeve 34 and a knurled set screw 44 is threadingly received within sleeve 34 and provides locking and adjustment means for clamp 38 which clampingly engages the outer periphery of flash gun 46 or a strobe light of similar configuration.

In use, reflector plate 12 is set into any desired position by loosening wing nut 20 upon bolt 18 and retightening it within the slots 22 and 16 and 16' of reflector plate 12. Set screw 36 provides further height adjustment means for reflector plate 12 by the raising or lowering of post 26 within opening 32 of sleeve 34.

It shall be noted that when the plate of the aforementioned embodiment of the present invention is turned around and the short tongue 14' is attached by the wing nut 20 and the plate 12 is then stored on the flashgun 46 and serves to protect the lens or the reflector of the lighting unit being used at the same time.

It shall further be recognized that the entire assembly which is held to the flashgun 46 or strobe light with the pushon spring clamp 38 may be instantly removed and installed by urging the clamp 38 off or on.

The deflector plate 12 may be swung downward and stored right on the camera and flash unit without removing it when it is desired to take regular, full beam flash or strobe photographs. The arcuate bracket member 24 is removable and the unit may be reversed in order that the assembly may fit either right- or left-hand mounted flashing devices attached to cameras.

While various changes may be made in the detail construction, it shall be understood that such changes shall be within the spirit and scope of the present invention as defined by the appended claim.

What I claim as new and desire to protect by Letters Patent of the United States is:

A bounce light beam deflector for cameras comprising in combination; a snap-on spring clamp means for engaging the outer periphery of a flashgun secured to a camera; a radially extending bar attached at one end to said spring clamp; a hollow, L-shaped sleeve slidably receiving the other end of said bar; means for securing said bar attached to said clamp within said sleeve at a desired position of adjustment; a post member having one end slidably received within the other end of said sleeve; means for securing said post in said sleeve in a desired position of adjustment; an arcuate bracket member having an arcuate slot therein mounted on the other end of said post member; a reflector plate having an elongated tongue on one edge of the reflector plate; a slotted opening in said tongue; bolt means slidably received within said arcuate slot of said bracket member and within the slotted opening in said elongated tongue for providing both angular and height adjustment of said reflector plate.

References Cited by the Examiner

UNITED STATES PATENTS

| | | | |
|---|---|---|---|
| 2,441,489 | 5/1948 | Jacobs | 240—1.3 |
| 2,892,927 | 6/1959 | Rosenblum | 240—1.3 |
| 2,898,447 | 8/1959 | Hanlon | 240—1.3 |
| 3,113,729 | 12/1963 | Koller | 240—52.1 X |

NORTON ANSHER, *Primary Examiner.*